(12) United States Patent
Nagaki et al.

(10) Patent No.: US 7,657,175 B2
(45) Date of Patent: Feb. 2, 2010

(54) OPTICAL COMMUNICATION DEVICE

(75) Inventors: Yuichi Nagaki, Kawasaki (JP); Yoshiaki Shibayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 526 days.

(21) Appl. No.: 11/492,978

(22) Filed: Jul. 26, 2006

(65) Prior Publication Data
US 2007/0230953 A1     Oct. 4, 2007

(30) Foreign Application Priority Data
Mar. 28, 2006   (JP)   ............... 2006-088966

(51) Int. Cl.
*G02F 1/00*   (2006.01)
(52) U.S. Cl. ............... 398/5; 398/13; 398/20; 398/22; 398/23; 398/33; 385/24; 385/16; 385/17; 385/18
(58) Field of Classification Search ............... 398/1, 398/2, 3, 4, 5, 6, 7, 8, 19, 25, 33, 43, 16, 398/10, 13, 17, 20, 45, 82, 79, 182, 183, 398/192, 195, 200, 201, 197, 202, 213, 214, 398/135, 136, 137, 138, 139, 128, 130, 141, 398/158, 159, 162, 22, 23, 24, 34, 38; 385/24, 385/16, 17, 18, 89, 92, 90, 93
See application file for complete search history.

(56) References Cited

U.S. PATENT DOCUMENTS 6,081,359 A * 6/2000 Takehana et al. ............... 398/1
6,563,979 B2 * 5/2003 Feinberg et al. ............... 385/24
7,024,110 B2 * 4/2006 Jasti ............... 398/5

FOREIGN PATENT DOCUMENTS

JP      06-216847 A     5/1994

* cited by examiner

*Primary Examiner*—Hanh Phan

(57) ABSTRACT

An optical communication device for detecting a defect in a standby optical fiber. An active optical output unit converts an electrical signal to an optical signal, and a standby optical output unit is provided as a substitute for the active optical output unit. An optical router is connected to the active optical output unit by an active optical fiber, and is also connected to the standby optical output unit by a standby optical fiber. The optical router outputs the optical signal received from the active optical output unit to the subsequent stage, and also outputs part of the optical signal to the standby optical output unit. A defect detector detects a defect in the standby optical fiber on the basis of the light level of the optical signal output from the optical router to the standby optical output unit through the standby optical fiber.

14 Claims, 5 Drawing Sheets

OPTICAL COMMUNICATION DEVICE

CROSS-REFERENCE TO RELATED APPLICATIONS

This application is based upon and claims the benefits of priority from the prior Japanese Patent Application No. 2006-088966 filed Mar. 28, 2006, the entire contents of which are incorporated herein by reference.

BACKGROUND OF THE INVENTION

1. Field of the Invention

The present invention relates to optical communication devices, and more particularly, to an optical communication device for detecting defects in optical fibers.

2. Description of the Related Art

Some optical communication devices employ a redundant configuration so that data transmission/reception can be performed even in the event of a fault occurring in the device (e.g., Unexamined Japanese Patent Publication No. H06-216847).

FIG. 5 shows an exemplary system configuration of conventional optical communication devices. As shown in the figure, an optical communication device 150 includes optical transmitters 151a, 151b, . . . , 151n, optical fibers 154aa, 154ba, 154ab, 154bb, . . . , 154an, 154bn, redundancy controllers 155a, 155b, . . . , 155n, redundant multiplexers 156a, 156b, . . . , 156n, an optical multiplexer 157, and an optical output unit 158. Another optical communication device 160 includes an optical input unit 161, an optical demultiplexer 162, redundant demultiplexers 163a, 163b, . . . , 163n, and optical receivers 164a, 164b, 164n. The optical communication devices 150 and 160 are connected by a WDM (Wavelength Division Multiplexing) transmission line 171.

The optical transmitter 151a includes an active unit 152 and a standby unit 153, each for converting an electrical signal to an optical signal. Specifically, the active and standby units 152 and 153 have transmitters 152a and 153a, respectively, both capable of converting an electrical signal to an optical signal and input with the same electrical signal. The transmitters 152a and 153a are configured in the same manner and convert the input electrical signals to optical signals of an identical wavelength.

The active and standby units 152 and 153 also have output controllers 152b and 153b, respectively. The output controllers 152b and 153b operate under the control of the redundancy controller 155a so that one of the optical signals output from the transmitters 152a and 153a may be supplied to the redundant multiplexer 156a.

Usually, the redundancy controller 155a controls the output controllers 152b and 153b in such a manner that the optical signal output from the transmitter 152a is delivered to the redundant multiplexer 156a. In the event a fault or the like occurs in the transmitter 152a, the redundancy controller 155a controls the output controllers 152b and 153b so that the optical signal output from the transmitter 153a may be supplied to the redundant multiplexer 156a.

The optical transmitters 151b, . . . , 151n are configured in the same manner as the optical transmitter 151a and each include active and standby units. The optical transmitters 151a, 151b, . . . , 151n are, however, adapted to convert electrical signals to optical signals of respective different wavelengths. The redundancy controllers 155b, . . . , 155n function in the same way as the redundancy controller 155a. Specifically, each of the redundancy controllers 155b, . . . , 155n usually controls its associated output controllers so that the optical signal from the active unit may be output and, in the event a fault or the like occurs in the active unit, controls the output controllers so that the optical signal from the standby unit may be output.

The redundant multiplexer 156a includes a coupler 156aa and outputs the optical signal supplied from the active or standby unit 152 or 153 to the optical multiplexer 157. Similarly, the redundant multiplexers 156b, . . . , 156n each include a coupler and output the optical signal supplied from the active or standby unit to the optical multiplexer 157. The optical transmitters 151a, 151b, . . . , 151n are connected to their corresponding redundant multiplexers 156a, 156b, . . . , 156n by the optical fibers 154aa, 154ba, 154ab, 154bb, . . . , 154an, 154bn.

The optical multiplexer 157 multiplexes the optical signals output from the redundant multiplexers 156a, 156b, . . . , 156n and outputs the multiplexed signal to the optical output unit 158. The optical multiplexer 157 comprises optical filters, for example, and multiplexes the optical signals of different wavelengths, output from the redundant multiplexers 156a, 156b, 156n.

The optical output unit 158 amplifies the optical signal output from the optical multiplexer 157 and outputs the amplified signal to the WDM transmission line 171.

The optical input unit 161 of the optical communication device 160 receives the optical signal from the WDM transmission line 171, amplifies the received signal, and outputs the amplified signal to the optical demultiplexer 162.

The optical demultiplexer 162 comprises optical filters, for example, and demultiplexes the wavelength-multiplexed optical signal output from the optical input unit 161 into optical signals of respective wavelengths. The optical signals of different wavelengths, demultiplexed by the optical demultiplexer 162, are output to the respective redundant demultiplexers 163a, 163b, . . . , 163n.

The redundant demultiplexer 163a, which includes a coupler 163aa, separates the optical signal output from the optical demultiplexer 162 into signals of an identical wavelength and outputs the separated optical signals to the optical receiver 164a. Similarly, each of the redundant demultiplexers 163b, . . . , 163n includes a coupler and separates the corresponding optical signal output from the optical demultiplexer 162 into signals of an identical wavelength.

The optical receiver 164a includes an active unit 165 and a standby unit 166, each for converting an optical signal to an electrical signal. Specifically, the active and standby units 165 and 166 have receivers 165a and 166a, respectively, which are capable of converting an optical signal to an electrical signal and input with the identical optical signals. The receivers 165a and 166a are configured in the same manner and output electrical signals, obtained by converting the input optical signals, to circuits of the subsequent stage.

Let it be assumed here that the optical fiber 154ba connecting the standby unit 153 and the redundant multiplexer 156a is defective due to improper connection or fault and also that the control is switched to the standby unit 153 because of a fault in the active unit 152. In this case, since the standby optical fiber 154ba connecting the standby unit 153 and the redundant multiplexer 156a is defective, a problem arises in that signal loss is caused.

SUMMARY OF THE INVENTION

The present invention was created in view of the above circumstances, and an object thereof is to provide an optical communication device capable of detecting defects in standby optical fibers.

To achieve the object, there is provided an optical communication device for detecting defects in optical fibers. The optical communication device comprises an active optical output unit for outputting an optical signal, a standby optical output unit provided as a substitute for the active optical output unit, an active optical fiber connected to the active optical output unit, a standby optical fiber connected to the standby optical output unit, an optical router connected to the active and standby optical fibers, the optical router being adapted to output the optical signal to a subsequent stage and also to output part of the optical signal from the active optical output unit to the standby optical output unit through the standby optical fiber, and a defect detector for detecting a defect in the standby optical fiber, based on a light level of the optical signal output from the optical router to the standby optical output unit.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
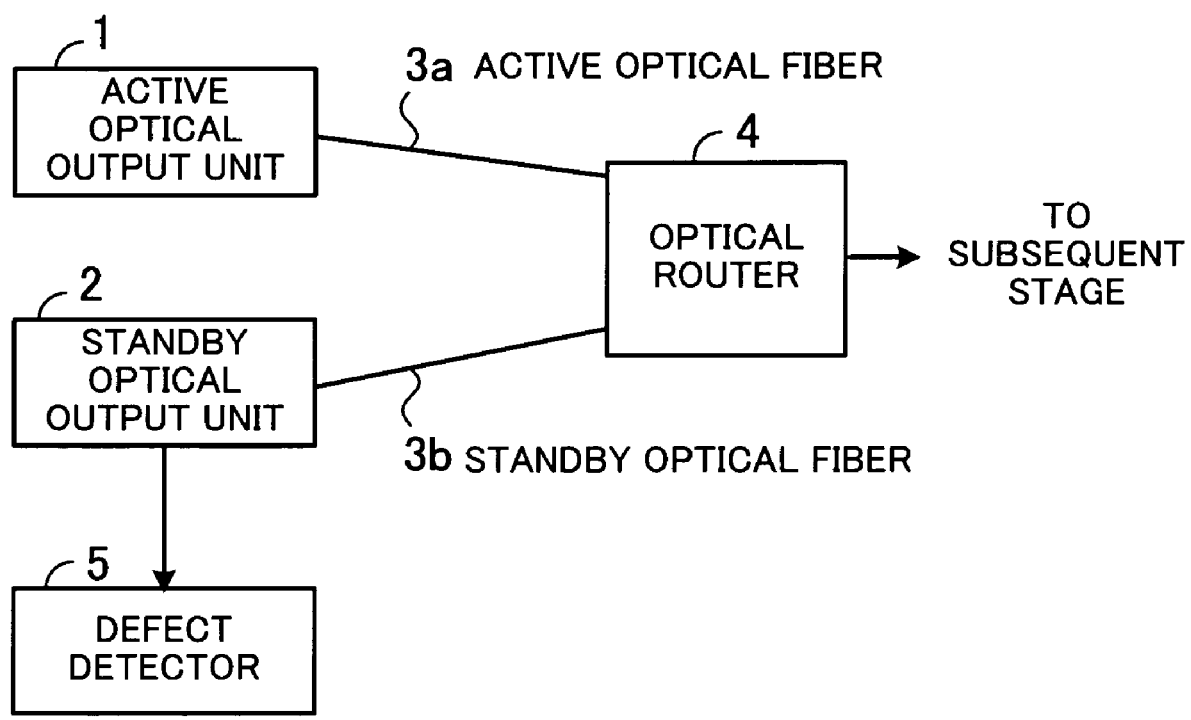
FIG. 1 schematically shows an optical communication device.

Preferred embodiments of the present invention will be described below with reference to the accompanying drawings, wherein like reference numerals refer to like elements throughout.

FIG. 1 schematically illustrates an optical communication device. As shown in the figure, the optical communication device includes an active optical output unit 1, a standby optical output unit 2, an active optical fiber 3a, a standby optical fiber 3b, an optical router 4, and a defect detector 5.

The active optical output unit 1 converts an electrical signal to an optical signal and outputs the resulting signal.

The standby optical output unit 2 is provided as a substitute for the active optical output unit 1. The standby optical output unit 2 is input with the same electrical signal as that input to the active optical output unit 1 and converts the electrical signal to an optical signal. In the event the active optical output unit 1 fails, for example, the standby optical output unit 2 outputs the optical signal in place of the active optical output unit.

The optical router 4 is connected to the active optical output unit 1 by the active optical fiber 3a, and is also connected to the standby optical output unit 2 by the standby optical fiber 3b. Usually, the optical router 4 outputs the optical signal supplied from the active optical output unit 1 to the subsequent stage. In the event the active optical output unit 1 fails, the optical router 4 outputs the optical signal supplied from the standby optical output unit 2 to the subsequent stage. The optical router 4 is adapted not only to output the optical signal received from the active optical output unit 1 to the subsequent stage but also to output part of the optical signal to the standby optical output unit 2.

The defect detector 5 detects a defect in the standby optical fiber 3b on the basis of the light level of the optical signal output from the optical router 4 to the standby optical output unit 2 through the standby optical fiber 3b. If the standby optical fiber 3b is improperly connected, for example, the light level of the optical signal output to the standby optical output unit 2 lowers. The defect detector 5 determines whether the light level of the optical signal is lower than a threshold or not, to detect improper connection etc. of the standby optical fiber 3b.

In this manner, part of the optical signal from the active optical output unit 1 is output to the standby optical output unit 2 through the standby optical fiber 3b. Then, based on the light level of the optical signal output to the standby optical output unit 2, a defect in the standby optical fiber 3b is detected. This makes it possible to detect a defect in the standby optical fiber 3b connecting the standby optical output unit 2 and the optical router 4.

The embodiments of the present invention will be now described in detail with reference to the drawings.

Figure 2:
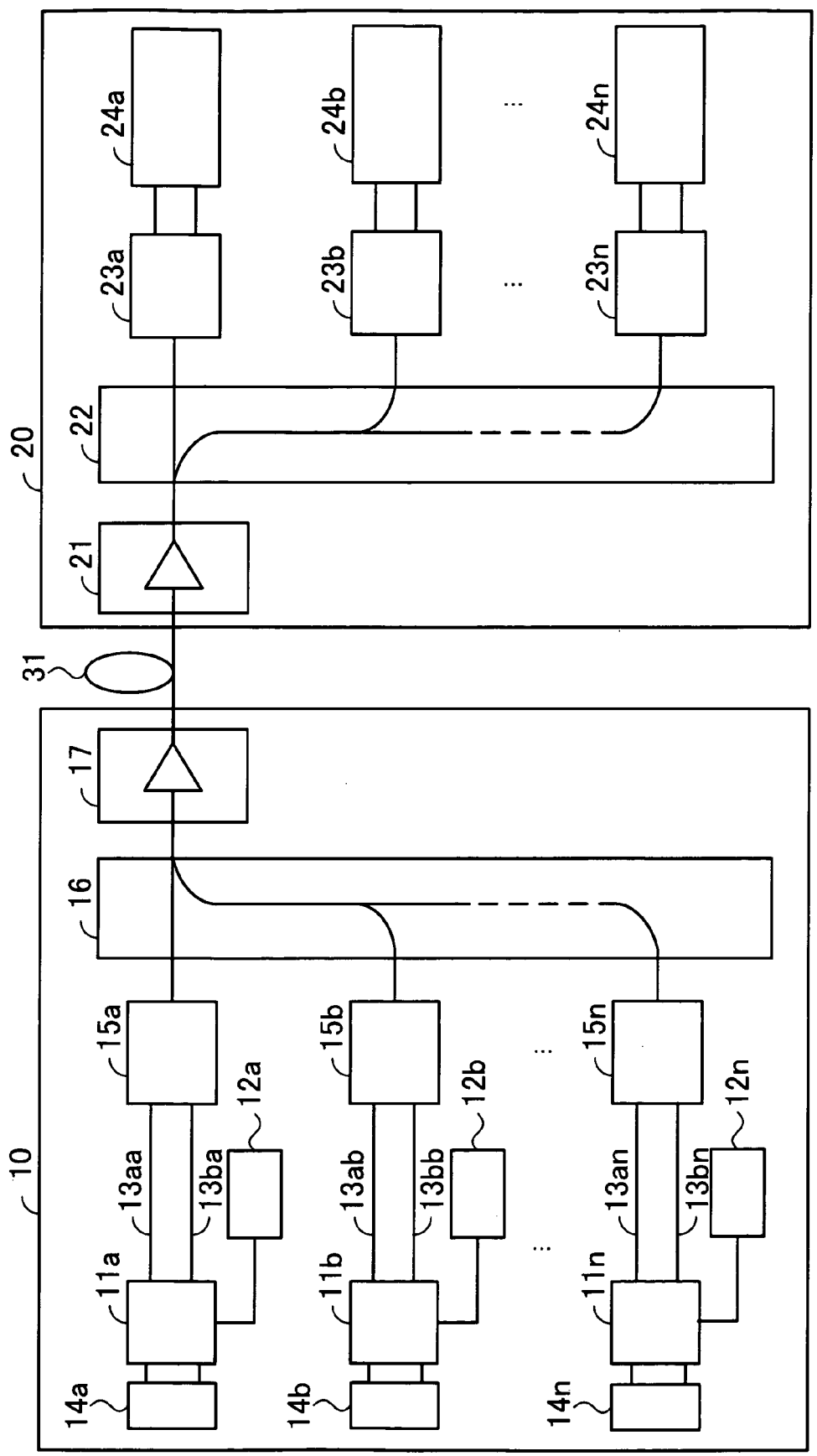
FIG. 2 shows an exemplary system configuration of optical communication devices.

FIG. 2 shows an exemplary system configuration of optical communication devices. As shown in the figure, an optical communication device 10 comprises optical transmitters 11a, 11b, . . . , 11n, optical fiber monitors 12a, 12b, . . . , 12n, optical fibers 13aa, 13ba, 13ab, 13bb, . . . , 13an, 13bn, redundancy controllers 14a, 14b, . . . , 14n, redundant multiplexers 15a, 15b, . . . , 15n, an optical multiplexer 16, and an optical output unit 17. Another optical communication device 20 comprises an optical input unit 21, an optical demultiplexer 22, redundant demultiplexers 23a, 23b, . . . , 23n, and optical receivers 24a, 24b, . . . , 24n. The optical communication devices 10 and 20 are connected by a WDM transmission line 31.

The redundancy controllers 14a, 14b, . . . , 14n, optical multiplexer 16 and optical output unit 17 of the optical communication device 10 are respectively identical with the redundancy controllers 155a, 155b, . . . , 155n, optical multiplexer 157 and optical output unit 158 of the optical communication device 150 explained above with reference to FIG. 5, and accordingly, description of these elements is omitted. Also, the optical communication device 20 is identical with the optical communication device 160 explained above with reference to FIG. 5, and therefore, description thereof is omitted.

Figure 5:
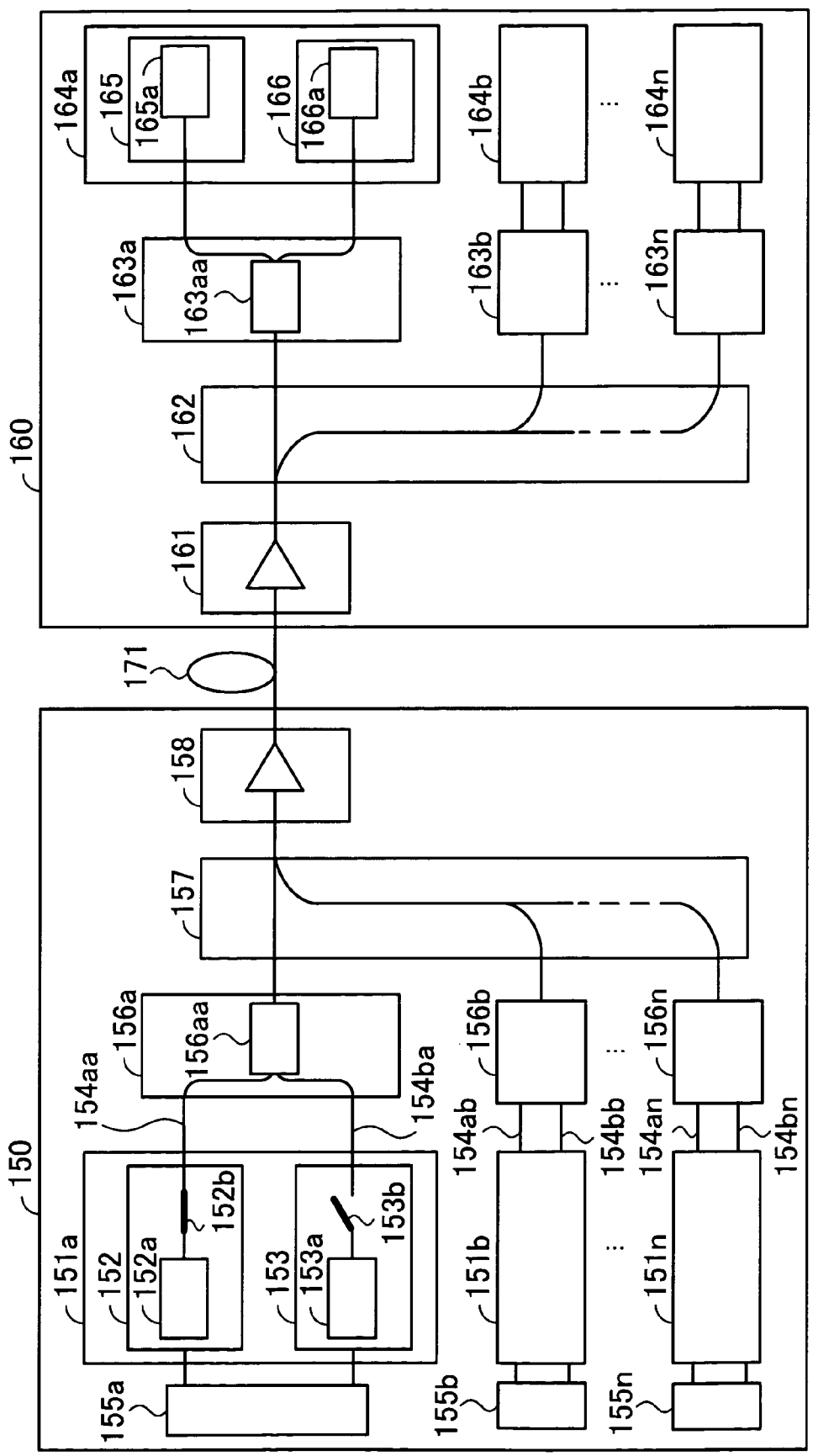
FIG. 5 shows an exemplary system configuration of conventional optical communication devices.

The optical transmitters 11a, 11b, . . . , 11n and the redundant multiplexers 15a, 15b, . . . , 15n differ in function from the optical transmitters 151a, 151b, 151n and redundant multiplexers 156a, 156b, . . . , 156n of the optical communication device 150 shown in FIG. 5. Also, the optical communication device 10 of FIG. 2 differs from the optical communication device 150 of FIG. 5 in that it additionally includes the optical fiber monitors 12a, 12b, . . . , 12n for detecting defects, such as improper connection or faults, in the optical fibers 13ba, 13bb, . . . , 13bn. In the following, the optical transmitters 11a, 11b, . . . , 11n, the optical fiber monitors 12a, 12b, . . . , 12n and the redundant multiplexers 15a, 15b, . . . , 15n will be explained in detail.

Figure 3:
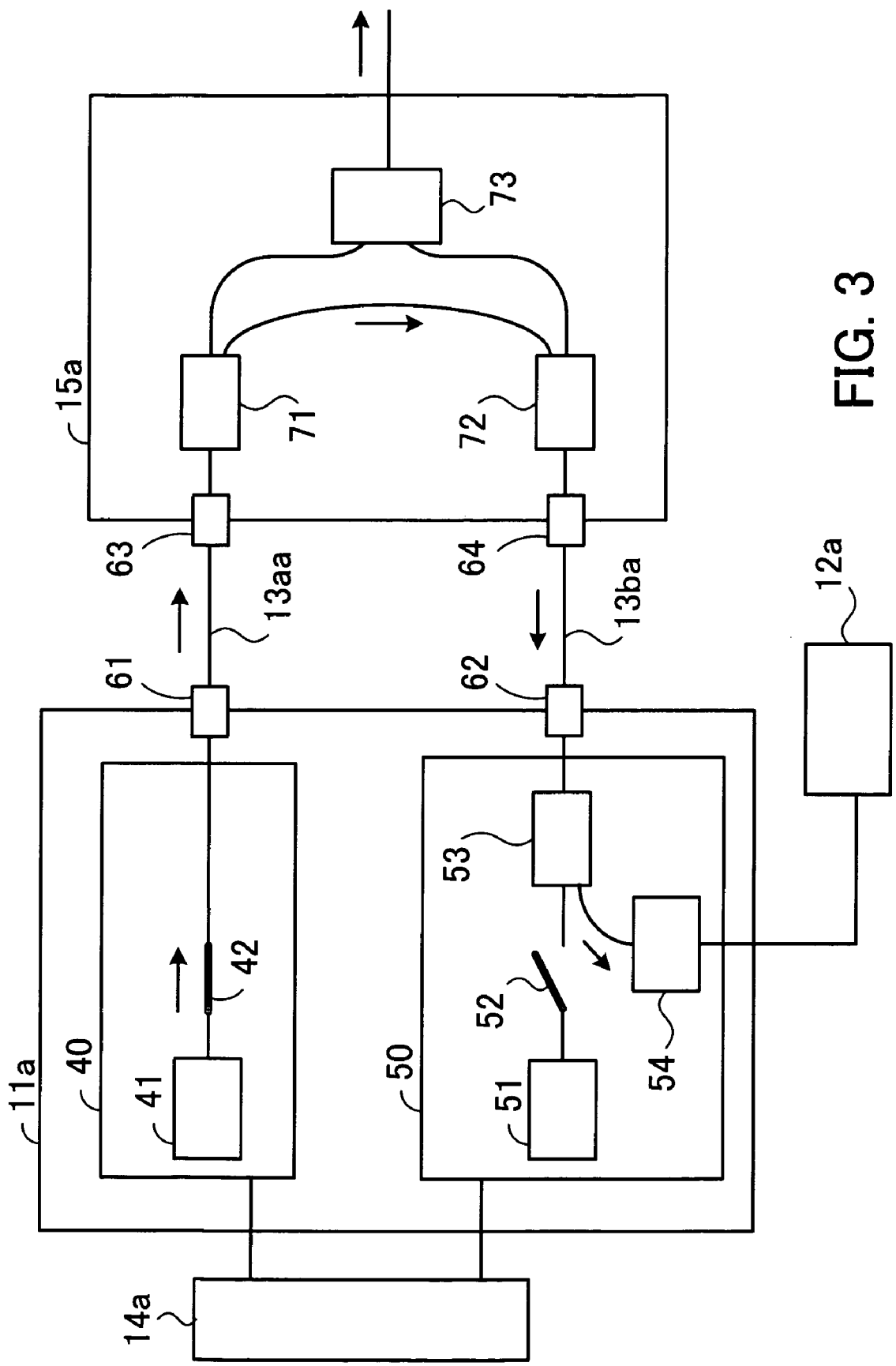
FIG. 3 shows in detail an optical transmitter, an optical fiber monitor and a redundant multiplexer.

FIG. 3 shows in detail the optical transmitter, the optical fiber monitor and the redundant multiplexer. In the figure are illustrated the optical transmitter 11a, the optical fiber monitor 12a and the redundant multiplexer 15a, besides the redundancy controller 14a, all appearing in FIG. 2.

The optical transmitter 11a includes an active unit 40 and a standby unit 50, each for converting an electrical signal to an optical signal. Specifically, the active and standby units 40 and 50 have transmitters 41 and 51, respectively, which are capable of converting an electrical signal to an optical signal and input with identical electrical signals. The transmitters 41 and 51 have the same configuration and convert the input electrical signals to optical signals of an identical wavelength. In FIG. 3, the arrows indicate the flow path of the optical signal output from the transmitter 41.

Also, the active and standby units 40 and 50 have output controllers 42 and 52, respectively. The output controllers 42 and 52 operate under the control of the redundancy controller 14a in such a manner that one of the optical signals output from the transmitters 41 and 51 is output to the redundant multiplexer 15a. Thus, even in the event the active unit 40 fails, the optical signal can be transmitted to the optical communication device 20 by the standby unit 50.

The standby unit 50 further includes a coupler 53 and a photodiode 54. The coupler 53 is adapted to output the optical signal from the transmitter 51 to the redundant multiplexer 15a, as well as to output the optical signal from the redundant multiplexer 15a to the photodiode 54. The photodiode 54 converts the optical signal output from the redundant multiplexer 15a to an electrical signal, and outputs the resulting signal to the optical fiber monitor 12a.

The optical fiber monitor 12a monitors the electrical signal output from the photodiode 54. For example, the optical fiber monitor 12a monitors the voltage level of the electrical signal output from the photodiode 54 and determines whether the voltage level is lower than a threshold or not. If the voltage level drops below the threshold, the optical fiber monitor 12a sends to the outside the notification that the optical fiber 13ba is defective, for example.

The optical transmitter 11a and the redundant multiplexer 15a have connectors 61 to 64. Specifically, the optical transmitter 11a and the redundant multiplexer 15a are connected to each other by the optical fibers 13aa and 13ba connected to the connectors 61 to 64.

The redundant multiplexer 15a includes couplers 71 to 73. The coupler 71 is input with the optical signal from the active unit 40 and separates the input optical signal into two, which are output to the couplers 72 and 73, respectively.

The coupler 72 outputs the optical signal received from the coupler 71 to the standby unit 50. The optical signal output in this manner is directed to the photodiode 54 by the coupler 53 of the standby unit 50, as mentioned above. Also, the coupler 72 outputs the optical signal received from the standby unit 50 to the coupler 73. The coupler 73 outputs the optical signal received from the active or standby unit 40 or 50 to the optical multiplexer 16 shown in FIG. 2.

Namely, the redundant multiplexer 15a outputs part of the optical signal received from the active unit 40 to the standby unit 50 through the optical fiber 13ba. The standby unit 50 converts the optical signal to an electrical signal and outputs the resulting signal to the optical fiber monitor 12a. If the optical fiber 13ba becomes defective due to improper connection with the connector 62, 64 or a fault, for example, the light level of the optical signal output from the redundant multiplexer 15a to the optical fiber monitor 12a lowers. Thus, the light level of the optical signal output from the redundant multiplexer 15a is monitored by the optical fiber monitor 12a, whereby a defect in the optical fiber 13ba can be detected. It is therefore possible to prevent a situation where signal loss is caused when the optical signal is transmitted from the standby unit 50 to the optical communication device 20 in case of failure of the active unit 40.

Lowering of the light level monitored by the optical fiber monitor 12a can also take place due to anomaly in the optical output of the active unit 40 or a defect in the active optical fiber 13aa. However, the active unit 40 is monitored for anomaly by the redundancy controller 14a and a defect in the active optical fiber 13aa can be detected by the optical receiver 24a. Accordingly, such anomaly and defect can be discriminated from a defect in the standby optical fiber 13ba.

The optical signal output from the active unit 40 to the coupler 73 of the redundant multiplexer 15a is transmitted to the optical communication device 20, whereas the optical signal output from the active unit to the coupler 72 is used to detect a defect in the optical fiber 13ba. Accordingly, the optical signal output to the coupler 73 has a light level higher than that of the optical signal output to the coupler 72.

Let it be assumed, for example, that the optical signal output from the transmitter 41 of the active unit 40 has a light level A and that the coupler 71 of the redundant multiplexer 15a outputs an optical signal with a light level B to the coupler 73 as well as an optical signal with a light level C to the coupler 72. In this case, the relationship B>>C (A=B+C) holds.

The following explains exemplary settings of the light levels. Let us suppose that the couplers 71, 72 and 53 each have a split ratio of 20:1. In this case, if the optical signal output from the transmitter 41 has a light level of 10.0 dBm, the light level of the optical signal output from the coupler 71 to the coupler 73 is 9.6 dBm and the light level of the optical signal output from the coupler 71 to the coupler 72 is 0.4 dBm. Consequently, the light level of the optical signal output from the coupler 72 to the standby unit 50 is −10.8 dBm, and the light level of the optical signal output from the coupler 53 to the photodiode 54 is −21.4 dBm.

The threshold which the optical fiber monitor 12a uses to detect a defect in the optical fiber 13ba is set to −25.5 dBm, in order to allow for a margin of error. Namely, the optical fiber monitor 12a does not judge the optical fiber 13ba to be defective as soon as the light level of the optical signal input to the photodiode 54 drops to −21.4 dBm; it judges that the optical fiber 13ba is defective when the light level drops to −25.5 dBm or below.

The optical fiber monitor 12a may be adapted to operate with hysteresis. For example, the optical fiber monitor 12a may operate with hysteresis of 1 dBm so that when the light level becomes higher than −24.5 dBm, the optical fiber 13ba may be judged to have been restored to its normality.

The above description is directed to the optical transmitter 11a, the optical fiber monitor 12a and the redundant multiplexer 15a. Since the optical transmitters 11b, . . . , 11n, the optical fiber monitors 12b, . . . , 12n and the redundant multiplexers 15b, . . . , 15n are configured in the same manner as illustrated in FIG. 3, description of these elements is omitted.

The optical transmitter 11a, the optical fiber monitor 12a and the redundant multiplexer 15a may be configured in a different way. With the arrangement shown in FIG. 3, only a defect in the standby optical fiber 13ba is detected. By configuring the elements differently, it is possible to also detect a defect in the active optical fiber 13aa.

Figure 4:
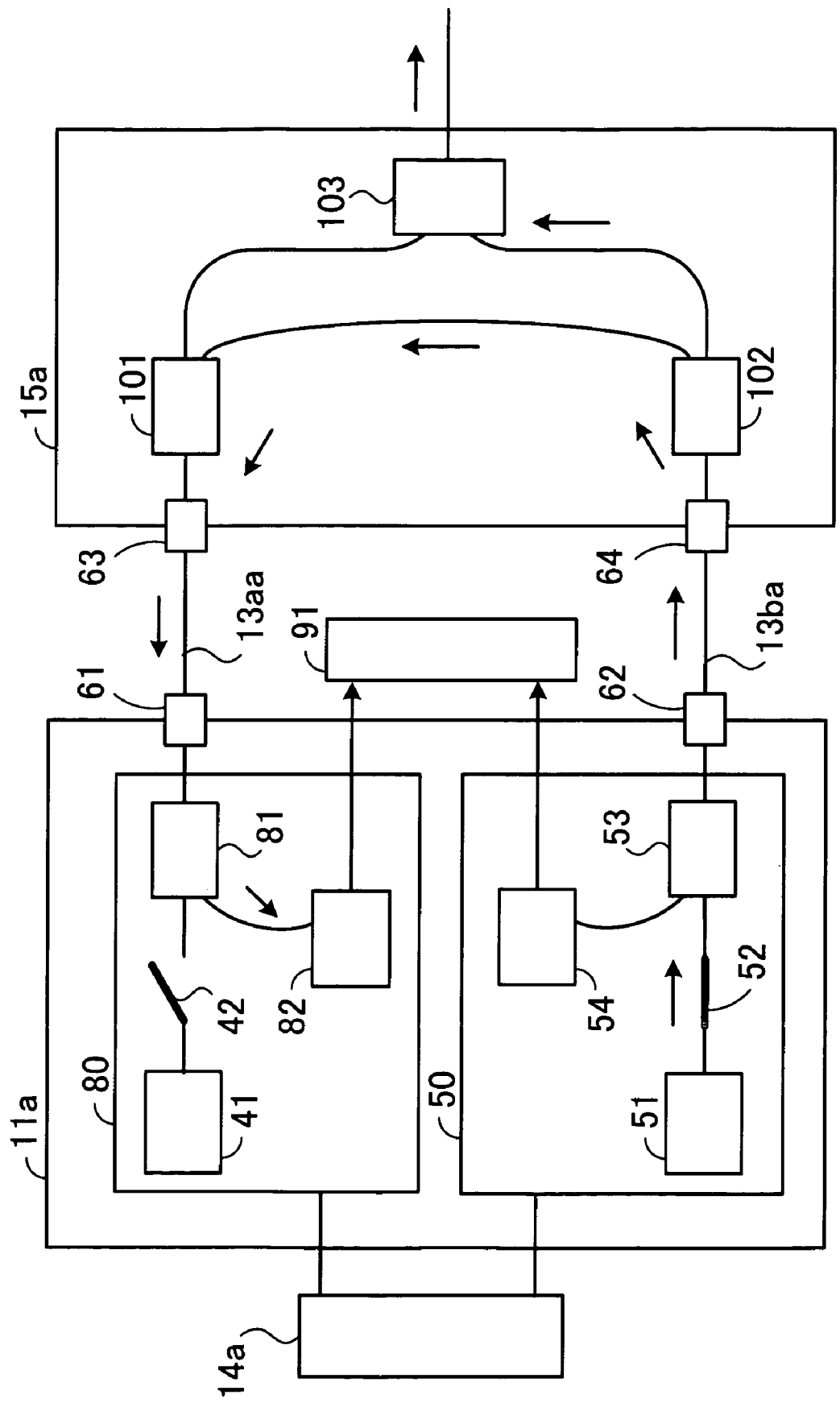
FIG. 4 shows another exemplary configuration of the optical transmitter, optical fiber monitor and redundant multiplexer.

FIG. 4 illustrates another exemplary configuration of the optical transmitter, optical fiber monitor and redundant multiplexer. In the figure are shown the optical transmitter 11a, the redundancy controller 14a, the redundant multiplexer 15a, as well as an optical fiber monitor 91. In FIG. 4, identical reference numerals are used to denote elements identical with those appearing in FIG. 3, and description of such elements is omitted. Also, the arrows in the figure indicate the flow path of the optical signal output from the transmitter 51.

The optical transmitter 11a includes an active unit 80 and a standby unit 50, each for converting an electrical signal to an optical signal. The active unit 80 has a transmitter 41 and an output controller 42 identical with those of the active unit 40 explained above with reference to FIG. 3, and further has a coupler 81 and a photodiode 82. Namely, the active unit 80 has a configuration identical with that of the standby unit 50.

The coupler 81 of the active unit 80 is adapted to output the optical signal from the transmitter 41 to the redundant multiplexer 15a, as well as to output the optical signal from the redundant multiplexer 15a to the photodiode 82. The photodiode 82 converts the optical signal output from the redundant multiplexer 15a to an electrical signal, and outputs the resulting signal to the optical fiber monitor 91.

The optical fiber monitor 91 monitors the electrical signals output from the photodiodes 54 and 82. For example, the optical fiber monitor 91 monitors the voltage levels of the electrical signals output from the photodiodes 54 and 82 and determines whether either of the voltage levels is lower than the threshold or not. If the voltage level of the signal from the photodiode 54 drops below the threshold, for example, the optical fiber monitor 91 sends to the outside the notification that the optical fiber 13ba is defective. Also, if the voltage level of the signal from the photodiode 82 drops below the threshold, for example, the optical fiber monitor 91 sends to the outside the notification that the optical fiber 13aa is defective.

The redundant multiplexer 15a includes couplers 101 to 103. The coupler 101 is input with the optical signal output from the active unit 80 and separates the input optical signal into two, which are output to the couplers 102 and 103, respectively. Also, the coupler 101 is input with the optical signal output from the coupler 102, and outputs the input optical signal to the active unit 80. This optical signal is output to the photodiode 82 via the coupler 81 of the active unit 80.

The coupler 102 outputs the optical signal received from the coupler 101 to the standby unit 50. The optical signal output in this manner is directed to the photodiode 54 by the coupler 53 of the standby unit 50. Also, the coupler 102 is input with the optical signal output from the standby unit 50 and separates the input optical signal into two, which are output to the couplers 101 and 103, respectively. The coupler 103 outputs the optical signal received from the active or standby unit 80 or 50 to the optical multiplexer 16 shown in FIG. 2.

Namely, the redundant multiplexer 15a outputs part of the optical signal from the active unit 80 to the standby unit 50, like the aforementioned arrangement shown in FIG. 3, to allow the optical fiber monitor 91 to detect a defect in the optical fiber 13ba. Also, the redundant multiplexer 15a outputs part of the optical signal from the standby unit 50 to the active unit 80, to allow the optical fiber monitor 91 to detect a defect in the optical fiber 13aa.

If the optical fiber 13aa becomes defective due to improper connection with the connector 61, 63 or a fault, for example, the light level of the optical signal output from the redundant multiplexer 15a to the optical fiber monitor 91 lowers. Thus, the light level of the optical signal output from the redundant multiplexer 15a is monitored by the optical fiber monitor 91, whereby a defect in the optical fiber 13aa can be detected.

It is therefore possible to prevent a situation where signal loss is caused when the optical signal is transmitted from the standby unit 50 to the optical communication device 20 in case of failure of the active unit 80. Further, it is possible to prevent a situation where signal loss is caused when the optical signal is again transmitted from the active unit 80 to the optical communication device 20 on the assumption that the active unit 80 has been restored to its normality.

The light levels of the signals to be subdivided by the couplers 53, 81, 101 and 102 may be set in the same manner as explained above with reference to FIG. 3. Also, the optical fiber monitor 91 may be adapted to operate with hysteresis, like the optical fiber monitor 12a.

Thus, part of the optical signal output from the active unit is directed to the standby unit through the standby optical fiber. Then, based on the light level of the optical signal output to the standby unit, a defect in the standby optical fiber is detected. This makes it possible to detect a defect in the standby optical fiber connecting the standby unit and the redundant multiplexer.

Also, since a defect in the standby optical fiber is detected, a defective fiber, if found, can be replaced with a normal fiber. This permits communication to be continued without incurring signal loss when the control is switched from the active unit to the standby unit.

Further, the optical communication device is designed in such a manner that complicated electrical parts (e.g., optical transmitters 11a, 11b, ..., 11n shown in FIG. 2) are separated from optical parts with relatively simple construction, in order to lower the failure rate. Specifically, the redundant multiplexers as optical parts are constituted by couplers, which are passive components, and defects in the optical fibers are detected by using the couplers, whereby the failure rate can be kept low.

Also, a defect in the optical fiber is detected by means of a relatively simple arrangement made up of the couplers, the photodiode and the optical fiber monitor for detecting the level of the electrical signal output from the photodiode, whereby the number of components can be restrained from increasing.

Furthermore, by causing part of the optical signal output from the standby unit to enter the active unit through the active optical fiber, it is possible to also detect a defect in the active optical fiber connecting the active unit and the redundant multiplexer.

In the optical communication device of the present invention, part of the optical signal output from the active optical output unit is made to enter the standby optical output unit through the standby optical fiber, and based on the light level of the optical signal output to the standby optical output unit, a defect in the standby optical fiber is detected. It is therefore possible to detect a defect in the standby optical fiber connecting the standby optical output unit and the optical router.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical communication device for detecting defects in optical fibers, comprising:
   active optical output means for outputting a first optical signal;
   standby optical output means, provided as a substitute for the active optical output means, for outputting a second optical signal;
   an active optical fiber connected to the active optical output means to carry the first optical signal;
   a standby optical fiber connected to the standby optical output means to carry the second optical signal;
   optical router means connected to the active and standby optical fibers, the optical router means being adapted to output the first optical signal to a subsequent stage and also to output part of the first optical signal from the active optical output means to the standby optical output means through the standby optical fiber in a direction opposite to the second optical signal from the standby optical output means; and defect detector means for detecting a defect in the standby optical fiber, based on a light level of the first optical signal output from the optical router means to the standby optical output means.

2. The optical communication device according to claim 1, wherein, if the light level is lower than a threshold, the defect detector means judges that the standby optical fiber is defective.

3. The optical communication device according to claim 2, wherein the defect detector means operates with hysteresis in detecting a defect in the standby optical fiber.

4. The optical communication device according to claim 1, wherein the first optical signal output to the subsequent stage has a light level higher than that of the first optical signal output to the standby optical output means.

5. The optical communication device according to claim 1, wherein the optical router means causes part of the second optical signal output from the standby optical output means to enter the active optical output means through the active optical fiber, and the defect detector means detects a defect in the active optical fiber, based on a light level of the second optical signal output from the optical router means to the active optical output means.

6. The optical communication device according to claim 1, wherein the active optical output means includes a plurality of active optical output means for outputting optical signals of respective different wavelengths, the standby optical output means includes a plurality of standby optical output means associated with the respective active optical output means, the optical router means includes a plurality of optical router means associated with respective pairs of the active and standby optical output means, and the defect detector means detects a defect in the standby optical fibers connected to the respective optical router means.

7. The optical communication device according to claim 1, wherein the optical router means comprises couplers.

8. An optical communication device for detecting defects in optical fibers, comprising:

an active optical transmitter to output a first optical signal;
a standby optical transmitter, provided as a substitute for the active optical transmitter, to output a second optical signal;
an active optical fiber connected to the active optical transmitter to carry the first optical signal;
a standby optical fiber connected to the standby optical transmitter to carry the second optical signal;

a multiplexer connected to the active and standby optical fibers, the multiplexer being adapted to output the first optical signal to a subsequent stage and also to output part of the first optical signal from the active optical transmitter to the standby optical transmitter through the standby optical fiber in a direction opposite to the second optical signal from the standby optical transmitter; and an optical fiber monitor to detect a defect in the standby optical fiber, based on a light level of the first optical signal output from the multiplexer to the standby optical transmitter.

9. The optical communication device according to claim 8, wherein, if the light level is lower than a threshold, the optical fiber monitor judges that the standby optical fiber is defective.

10. The optical communication device according to claim 9, wherein the optical fiber monitor operates with hysteresis in detecting a defect in the standby optical fiber.

11. The optical communication device according to claim 8, wherein the first optical signal output to the subsequent stage has a light level higher than that of the first optical signal output to the standby optical transmitter.

12. The optical communication device according to claim 8, wherein the multiplexer causes part of the second optical signal output from the standby optical transmitter to enter the active optical transmitter through the active optical fiber, and the optical fiber monitor detects a defect in the active optical fiber, based on a light level of the second optical signal output from the multiplexer to the active optical transmitter.

13. The optical communication device according to claim 8, comprising:

a plurality of the active optical transmitters to output a plurality of the first optical signals with different wavelengths;

a plurality of the standby optical transmitters to output a plurality of the second optical signals with different wavelengths;

a plurality of the active optical fibers respectively connected to the active optical transmitters to carry the first optical signals;

a plurality of the standby optical fibers respectively connected to the standby optical transmitters to carry the second optical signals; and a plurality of the multiplexers respectively connected to the active and standby optical transmitters via the active and standby optical fibers;

wherein the optical fiber monitor detects a defect in the standby optical fibers, based on light levels of the first optical signals output from the multiplexers to the standby optical transmitters.

14. The optical communication device according to claim 8, wherein the multiplexer comprises couplers.

* * * * *